United States Patent [19]
Houghteling

[11] Patent Number: 5,383,711
[45] Date of Patent: Jan. 24, 1995

[54] HEAD SUPPORT

[76] Inventor: Barbara S. Houghteling, 962 Xenon Ct., Golden, Colo. 80401

[21] Appl. No.: 121,170

[22] Filed: Sep. 14, 1993

[51] Int. Cl.⁶ ............................................... A47C 7/38
[52] U.S. Cl. ......................................... 297/397; 5/636; 5/640; 297/464; 297/DIG. 6
[58] Field of Search ................... 297/219.12, 391, 397, 297/464, 485; 5/636, 637, 640, 643

[56] References Cited

U.S. PATENT DOCUMENTS

| | | | |
|---|---|---|---|
| 2,464,435 | 3/1949 | Conradt | 297/397 |
| 2,468,587 | 4/1949 | Chase et al. | |
| 2,587,196 | 2/1952 | Morecroft | 297/397 X |
| 3,608,964 | 9/1971 | Earl | 297/397 |
| 4,204,695 | 5/1980 | Salzman | |
| 4,383,713 | 5/1983 | Roston | 299/397 |
| 4,568,125 | 2/1986 | Sckolnik | |
| 4,779,930 | 10/1988 | Rosen | |
| 4,892,357 | 1/1990 | Nieto-Busby et al. | |
| 4,964,418 | 10/1990 | Wilson | 5/636 X |
| 5,064,245 | 11/1991 | Stephens | 297/397 |
| 5,161,855 | 11/1992 | Harmon | 297/391 X |
| 5,228,745 | 7/1993 | Hazel | 297/219.12 X |

OTHER PUBLICATIONS

Catalog advertisement for new infant car seat w/pump date unknown–admitted prior art.
Catalog advertisement for Proppie TM infant support liner date unkown–admitted prior art.
Catalog advertisement for Sleeping Wings head supports. date unknown–admitted prior art.
Catalog advertisement for Heads Up Cuddler head support. date unknown–admitted prior art.
Catalog advertisement for Ride and Rest head support. date unknown–admitted prior art.
Advertising literature for The Right Fit universal seat insert. date unknown–admitted prior art.
Copies of product packaging for Auto Pillow. date unknown–admitted prior art.
Copies of product packaging for Head's Rite stroller cover with Head Support System by Pansy Ellen 1988.

Primary Examiner—Peter R. Brown

[57] ABSTRACT

A head support for use with infant retaining devices such as infant and children's car seats, infant carriers, cribs, bassinets, bouncer seats, high chairs, baby strollers, toddler booster car seats, and the like, and also for use by adults traveling on trains, busses, cars, airplanes, etc., particularly to retain a user's head in an upright orientation while sleeping, includes at least one flexible support member connected to a base member and at least one fastener, such as VELCRO (TM) or snaps, for securing the support member to the base member in an at least partially over-folded orientation for supporting the head of an infant or small child. More preferably, the head support includes two flexible support members connected to the base member and having respective free end portions adjustably secured to the base member and forming A-frame supports for supporting opposite lateral portions of the head of an infant or child therebetween. The support members preferably comprise resilient foam pieces disposed within a fabric cover. An optional liner sheet connected to the base member and dimensioned to at least partially support the torso of an infant or child includes slotted portions dimensioned to receive retaining straps to secure the infant or child in an infant retaining device. A pair of clips secured by elastic straps to the base member allow securement of the head support to a wide variety of different infant retaining devices.

16 Claims, 10 Drawing Sheets

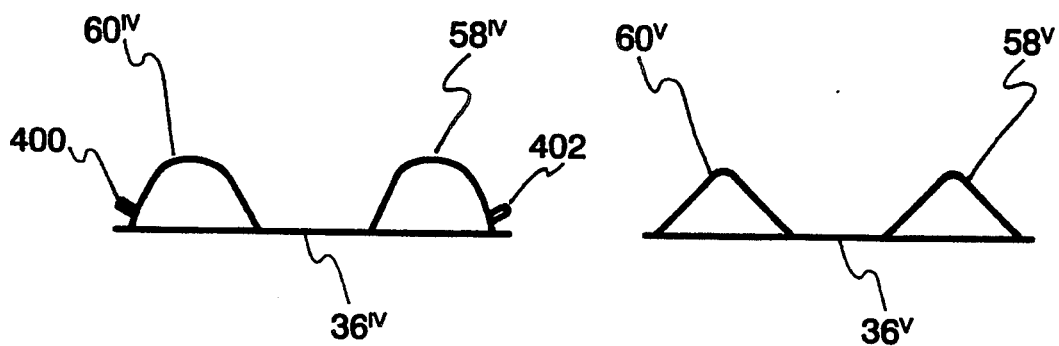 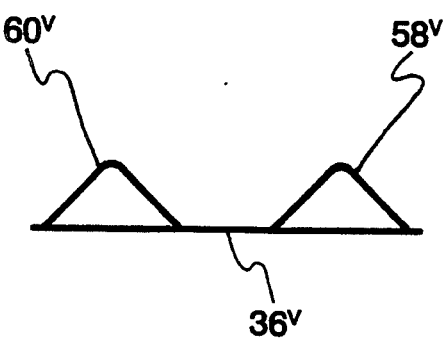
*Fig. 10*  *Fig. 11*
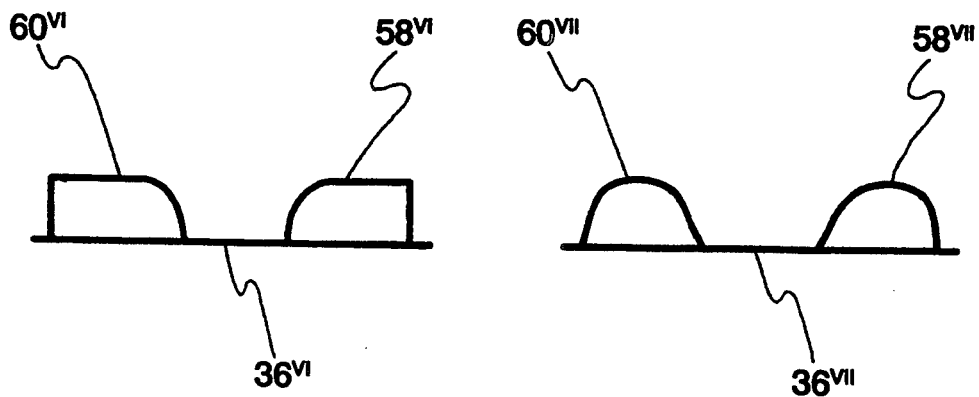 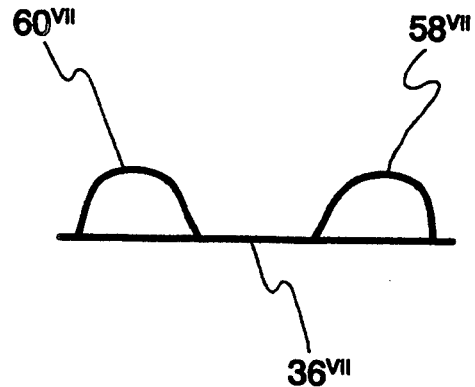
*Fig. 12*  *Fig. 13*

HEAD SUPPORT

BACKGROUND OF THE INVENTION

1. Field of the Invention

The present invention relates to head supports, and more particularly pertains to a head support primarily adapted for use with infant retaining devices such as infant and children's car seats, infant carriers, cribs, bassinets, bouncer seats, high chairs, baby strollers, toddler booster car seats, and the like, used for the retention of infants and small children, which can also be used to support an infant lying flat on the floor or on a table. The head support of the present invention may also be utilized by adults, for example while traveling on trains, busses, cars, airplanes, etc., or while relaxing in easy chairs or recliners, particularly to retain a user's head in an upright orientation while sleeping.

2. Description of the Prior Art

Infant retaining devices such as infant and children's car seats, infant carriers, bouncer seats, high chairs, baby strollers, toddler booster car seats, and the like, used for the retention of infants and small children, are typically sized by the manufacturer to accommodate a fairly large age and size range. Suitability for use with a fairly wide age and size range of infants and small children is preferred by consumers due to the fairly expensive nature of such retaining devices. Accordingly, such retaining devices typically do not provide adequate support for the heads of infants and smaller children since the devices are sized to also accommodate substantially larger children. Because of the resulting inadequate head support, the heads of infants and small children situated in such retaining devices tend to fall to one side, or to flop about depending upon movement of the retaining device. The typical lack of muscular development of the necks of infants and small children exacerbates this problem, and creates the potential for serious, potentially permanent injury.

A variety of devices have been proposed by the prior art in attempts to solve these problems. However, the prior art devices suffer from various drawbacks including undesired restriction of the shoulders and arms of infants and small children, undesired covering and abutment with the top of the head, restriction of vision, lack of adjustability, incompatibility with some of the various types of retaining devices, and difficulty in cleaning.

Seating for adults on vehicles such as trains, busses, cars, airplanes, etc., typically lacks provisions for maintaining a passenger's head in an upright orientation. As a result, passengers' heads tend to flop forwardly or to one side, resulting in discomfort, fatigue, restlessness, and neck pain. Similar difficulties arise in connection with individuals relaxing in chairs and recliners.

SUMMARY OF THE INVENTION

Accordingly, in order to solve these and other deficiencies present in the prior art and to achieve other objectives, the present invention provides a new and improved head support primarily adapted for use with infant retaining devices, such as infant and children's car seats, infant carriers, cribs, bassinets, bouncer seats, high chairs, baby strollers, toddler booster car seats, and the like, which includes at least one flexible head support member connected to a base member and at least one fastener, such as VELCRO (TM) or snaps, for securing the support member to the base member in an at least partially over-folded orientation for supporting the head of an infant or small child. More preferably, the head support includes two flexible support members connected to the base member and having respective free end portions adjustably secured to the base member and forming A-frame supports for supporting opposite lateral portions of the head of an infant or child therebetween. The support members each preferably comprise resilient foam pieces disposed within a fabric cover. An optional liner sheet connected to the base member and dimensioned to at least partially underlie the torso of an infant or child includes slotted portions dimensioned to receive retaining straps to secure the infant or child in position in a retaining device. A pair of clips secured by elastic straps to the base member, or alternatively pairs of twill tape ties, or cooperating hook and loop fasteners, allow securement of the head support to a wide variety of different infant retaining devices. An alternative form of the head rest omits the liner sheet and is intended primarily for use by adults and older children to retain a user's head in an upright orientation while sleeping when traveling on trains, busses, cars, airplanes, etc., or while relaxing in easy chairs or recliners.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 10 is an end elevational view of a modified head support construction, employing inflatable head support members each having a rounded transverse cross-sectional shape.

FIG. 11 is an end elevational view of a modified head support construction, employing head support members each having a triangular transverse cross-sectional shape.

FIG. 12 is an end elevational view of a modified head support construction, employing head support members each having a rectangular transverse cross-sectional shape possessing rounded inner longitudinal edges.

FIG. 13 is an end elevational view of a modified head support conjuction, employing head support members each having a rectangular transverse cross-sectional shape possessing rounded inner and outer longitudinal edges.

DETAILED DESCRIPTION OF THE PREFERRED EMBODIMENT(S)

Figure 1:
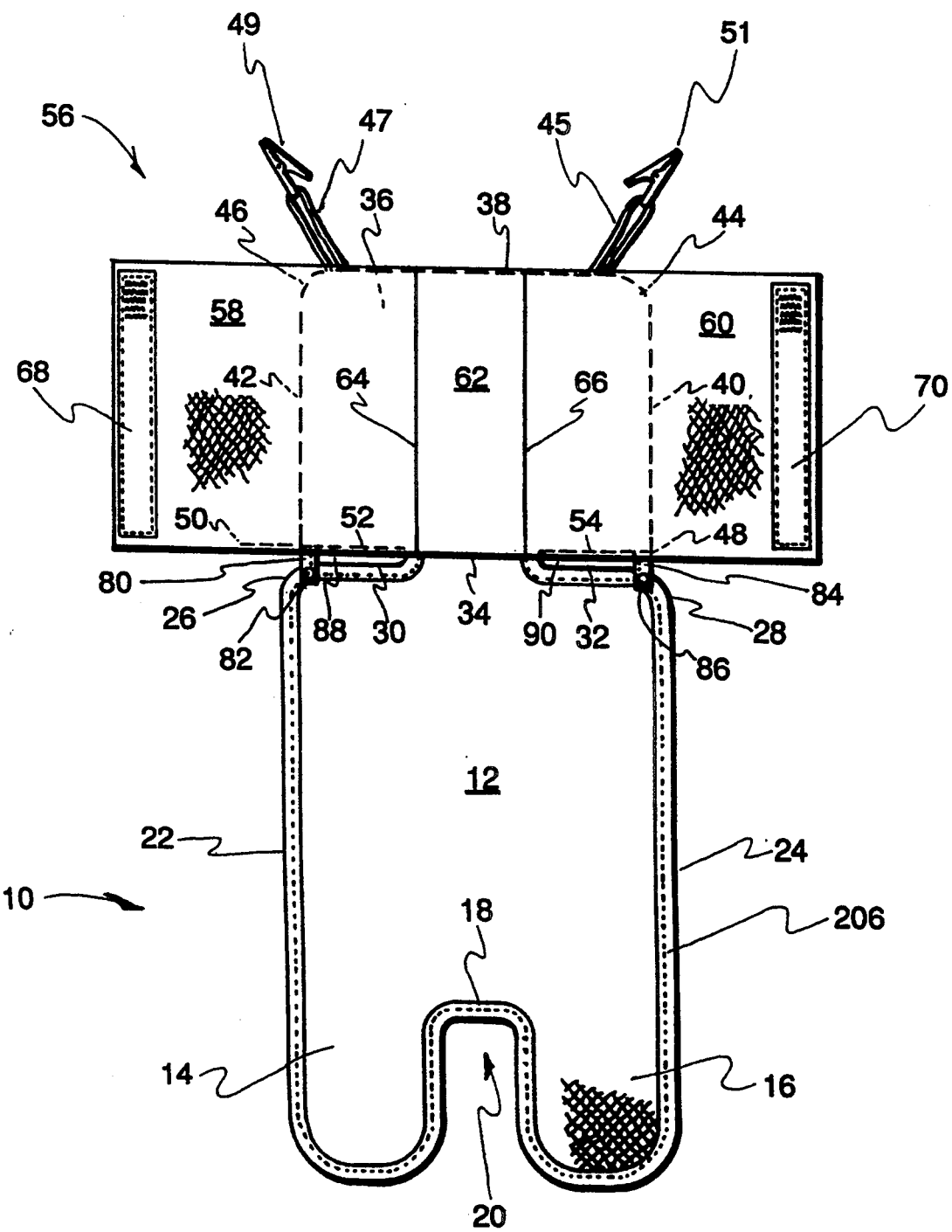
FIG. 1 is a top plan view of a head support according to a first embodiment of the present invention, in a flattened configuration.
Figure 6:
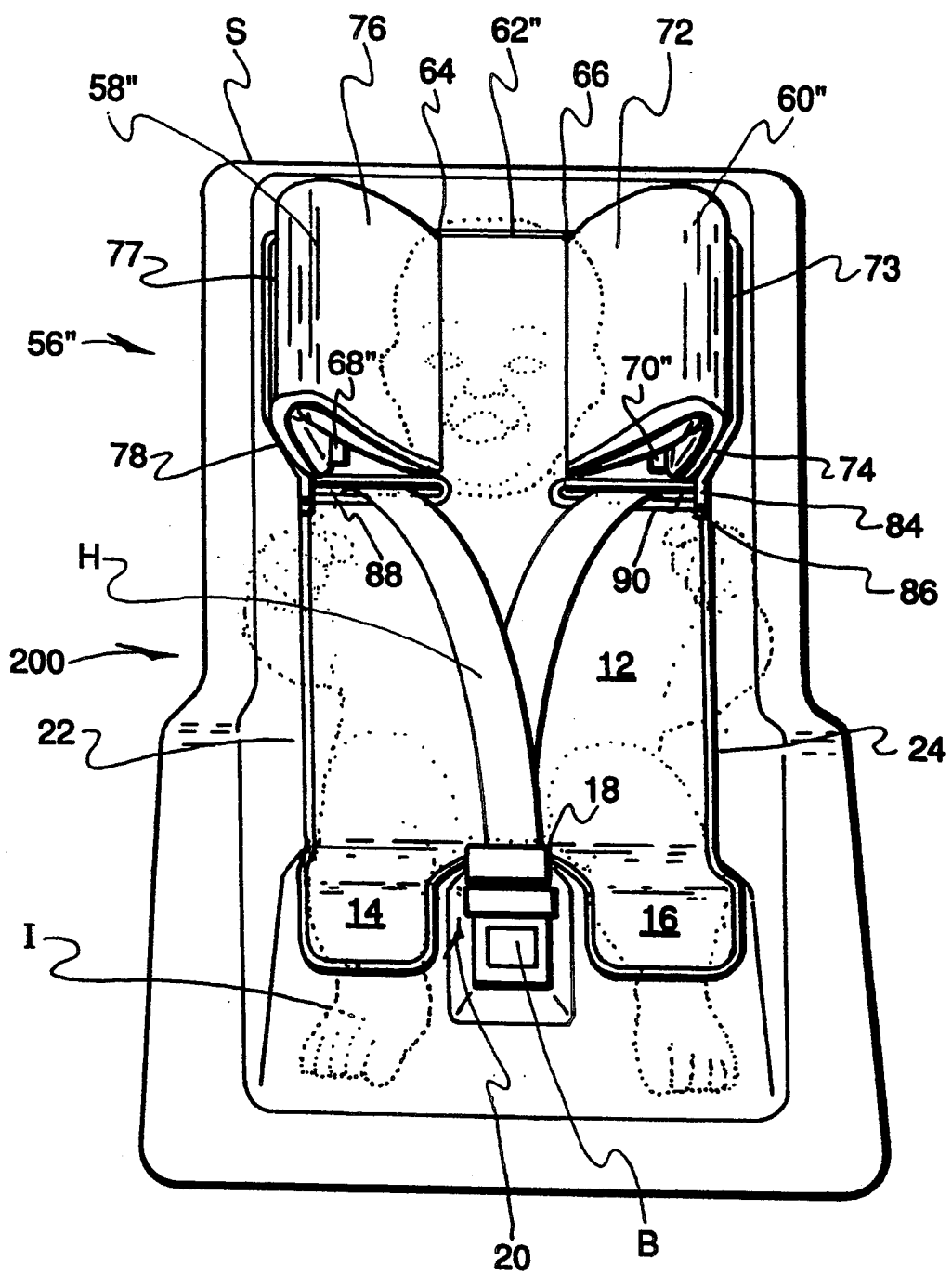
FIG. 6 is a perspective view illustrating the head support of FIG. 5 installed in a conventional child car seat.

Referring now to the drawings, wherein like reference numerals designate corresponding structure throughout the views, and referring in particular to FIG. 1, an improved head support 10 primarily adapted for use with infant retaining devices such as infant and children's car seats, infant carriers, cribs, bassinets, bouncer seats, high chairs, baby strollers, toddler booster car seats, and the like, according to a first preferred embodiment of the invention includes a liner sheet 12 connected to a head support 56. The liner sheet 12 is preferably formed from either two fabric sheets that are lightly padded or a quilted fabric material and is dimensioned to at least partially underlie the torso of an infant or small child. The liner sheet 12, in a manner known per se, includes a bifurcated bottom end portion forming legs 14 and 16 connected by a substantially transverse edge 18 of a central recess or notch 20. When employed with a conventional child car seat S as depicted in FIG. 6, notch 20 accommodates the conventional buckle B of a retaining strap or harness H in the region of releasable attachment to the seat bottom portion to retain an infant I.

Opposite rounded corners 26 and 28 connect spaced substantially parallel longitudinal edge portions 22 and 24 of the liner sheet 12 to respective transverse end edge portions 30 and 32. A neck portion 34 centrally connects the liner sheet 12 to the head support 56. While the preferred embodiments of the invention utilize the head support 56 in conjunction with the liner sheet 12, the present invention also contemplates use of the head support 56 alone, or in combination with different elements. For example, the head support 56 may be removably or permanently secured to or integrally formed with an infant retaining device, with or without an accompanying liner sheet.

The head support 56 comprises a base member or sheet 36 having a generally rectangular shape and including spaced substantially parallel longitudinal edge portions 40 and 42 connected by radiused corners 44 and 46 to a transverse end edge 38. Alligator-type clips 49 and 51 secured to the transverse top edge 38 of base number 36 by respective elastic loop straps 47 and 45 allow convenient, expeditious releasable securement of the base member 36 to a variety of different infant retaining devices. For example, clips 49 and 51 may be secured to a back portion of a conventional child car seat by extending straps 47 and 45 over a top edge portion of the seat. Alternatively, straps 47 and 45 may be looped around rungs or other frame portions of infant restraining devices such as high chairs and then secured by clips 49 and 51. The use of the straps 47 and 45 and the associated alligator-type clips 49 and 51 helps insure that the head support 56 will not flop down before or after placing a baby in the infant restraint device, thereby obviating any need for an adult to use a hand to manipulate the head support while simultaneously holding the baby and placing the baby in the infant restraining device with the other hand—a dangerous operation.

A pair of elongated substantially rectangular head support members 58 and 60 extend laterally outwardly in opposite directions from a central medial portion or connecting web 62. In accordance with the particular construction of the first embodiment 10, head support members 58 and 60 comprise two resilient foam pieces disposed within an integral quilted fabric cover and sewn to the base member 36 along longitudinal seams 64 and 66, which effect permanent central securement of the web 62 to the base member 36. The foam pieces preferably do not extend into the quilted web 62, which is thus relatively thinner than support members 58 and 60. The straps 47 and 45 are preferably elastic so that the associated clips 49 and 51 do not become disattached when the head support 56 is moved, such as when an infant is removed from the head support 56.

Figure 2:
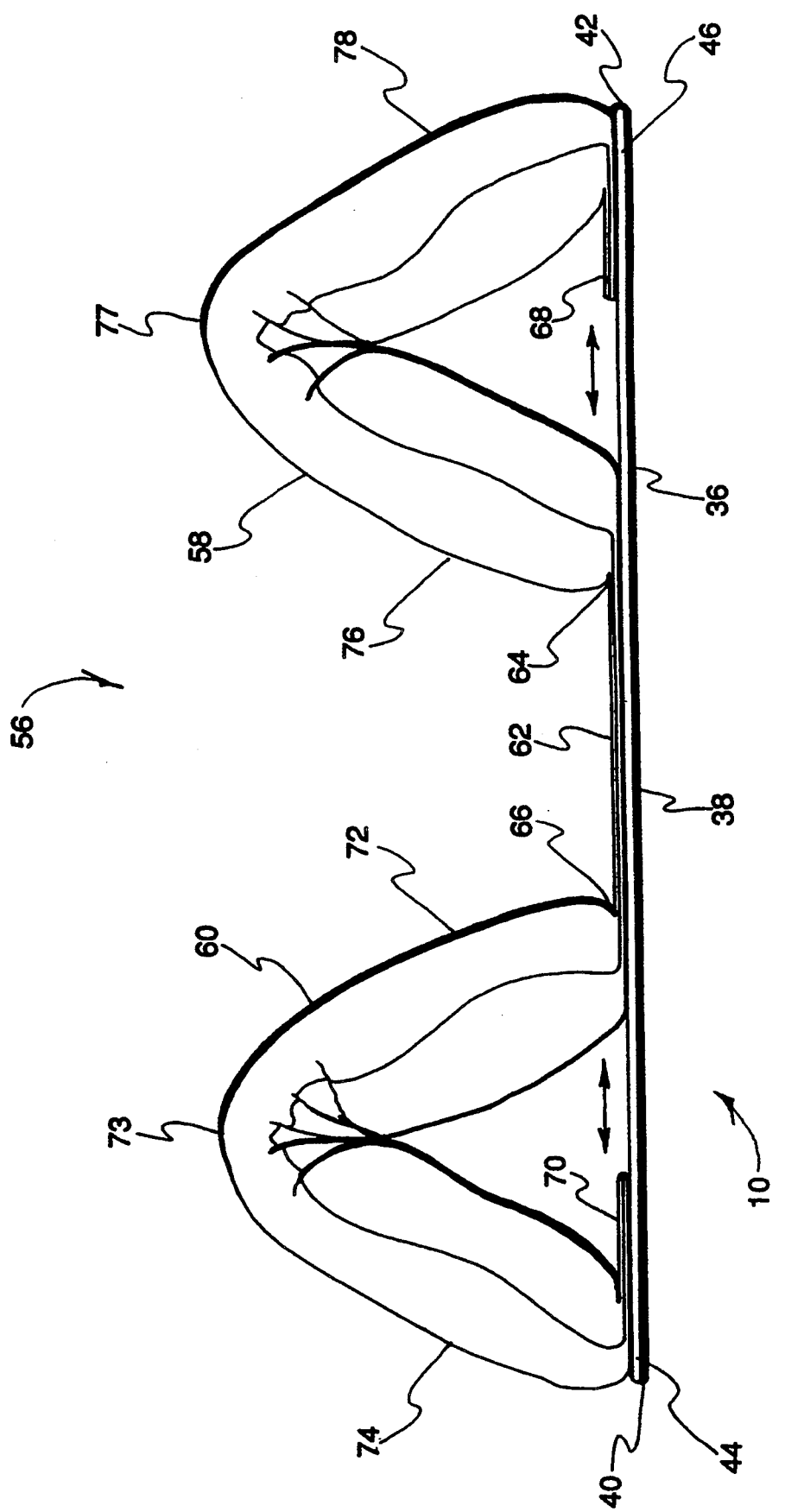
FIG. 2 is a front end elevational view of the head support of FIG. 1 in a first adjusted erected configuration.
Figure 3:
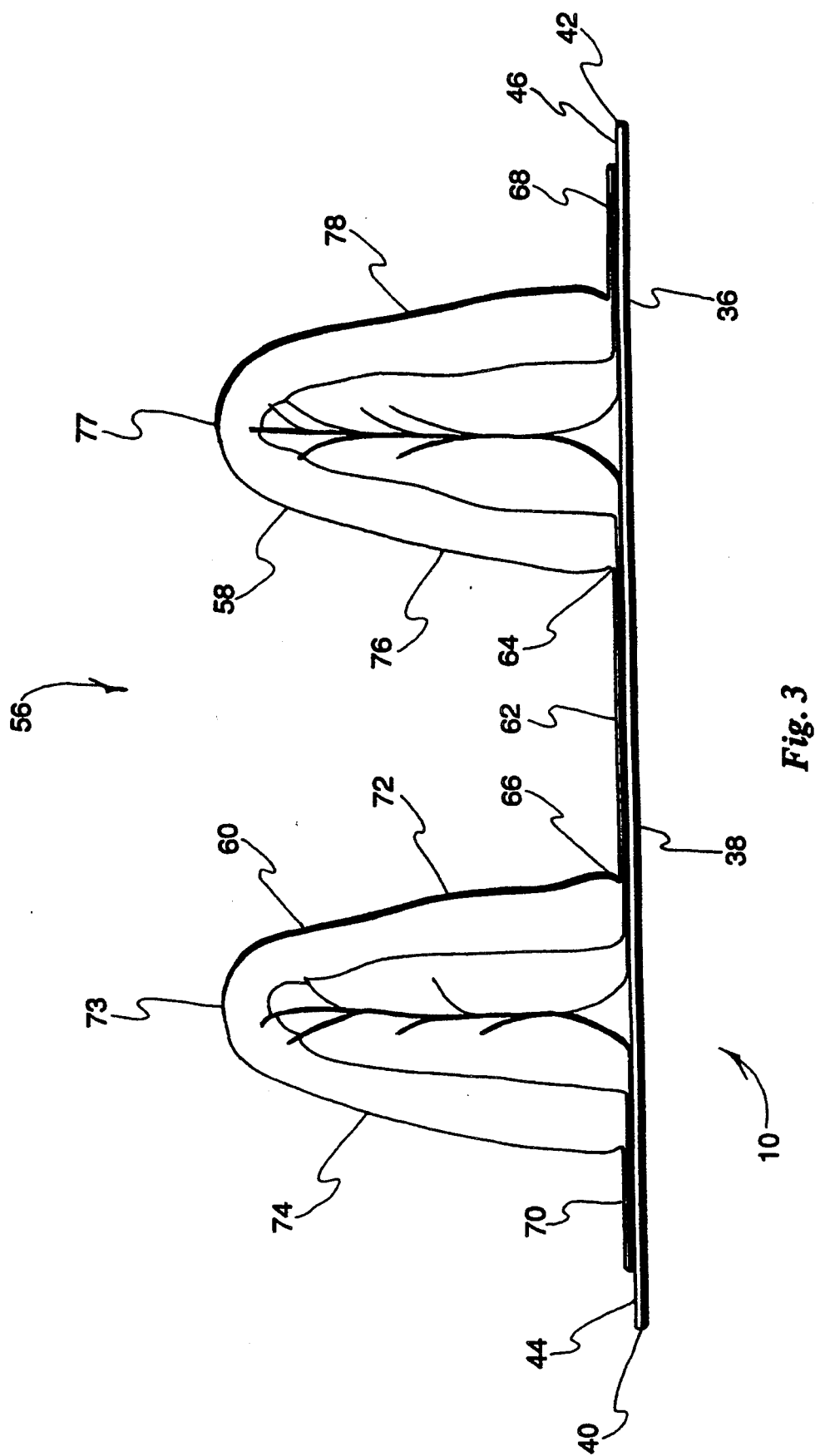
FIG. 3 is a front end elevational view of the head support of FIG. 1 in a second adjusted erected configuration.

Longitudinally extending hook fastening strips 68 and 70 of cooperating hook and loop pile fasteners, of the type sold under the trademark VELCRO, are sewn along outer free end edge portions of the head support members 58 and 60 and effect adjustable securement of the free end portions of the head support members 58 and 60 to the base member 36, as shown in FIGS. 2 and 3. In this context, base member 36 preferably comprises a relatively open weave or spun fabric material susceptible of secure yet releasable engagement with the hook fasteners of strips 68 and 70, thus obviating the necessity of providing discrete cooperating loop pile fastening strips and allowing independent adjustable securement of strips 68 and 70 within an infinite range.

With further reference to FIGS. 2 and 3, fastening strips 68 and 70 effect releasable securement of the head support members 58 and 60 to the base member 36 in an overfolded A-frame configuration, forming respective inner 76, 72 and outer 78, 74 inclined surfaces connected by apex portions 77 and 73. Selective positioning of the fastening strips 68 and 70 along the base member 36 effects conjoint adjustment of the lateral position and inclination of inner head engaging inclined surfaces 76 and 72 for the purpose of adapting the head support 56 to different individuals and different infant retaining devices. The fastener strips 68 and 70 preferably turn in toward the connecting web 62 when secured to the base member 36 as shown in FIG. 2, however, the fastening strips 68 and 70 may less preferably turn out toward the edge portions 40 and 42 as shown in FIG. 3. In this latter configuration, however, movement of the infant's head tends to force the head support members 58 and 60 outwardly such that the fastening strips 68 and 70 tend to become disattached from the base member 36. In this latter alternative configuration (FIG. 3), the strips 68 and 70 are sewn to the under side of the outer edges of the support members 58 and 60, rather than to the upper side as shown in FIG. 1.

While the preferred form of the invention contemplates the illustrated provision of two spaced head support members dimensioned to receive a child's or infant's head therebetween, the use of a single head support member is also within the scope of the invention. Such a single head support member might advantageously be employed to position an infant's head in a proper orientation for nursing, while leaving an unobstructed lateral region to receive a bottle or breast.

With reference to FIGS. 1 and 6, slotted portions 88 and 90 formed between respective spaced end edge portions 30, 52 and 32, 54 of the liner sheet 12 and the base member 36, in conjunction with straps 80 and 84 releasably secured between radiused corners 50 and 48 of the base member 36 and 26 and 28 of the liner sheet 10 by snaps 82 and 86, receive conventional restraining straps of a harness H of an infant retaining device, such as a child car seat S.

Figure 4:
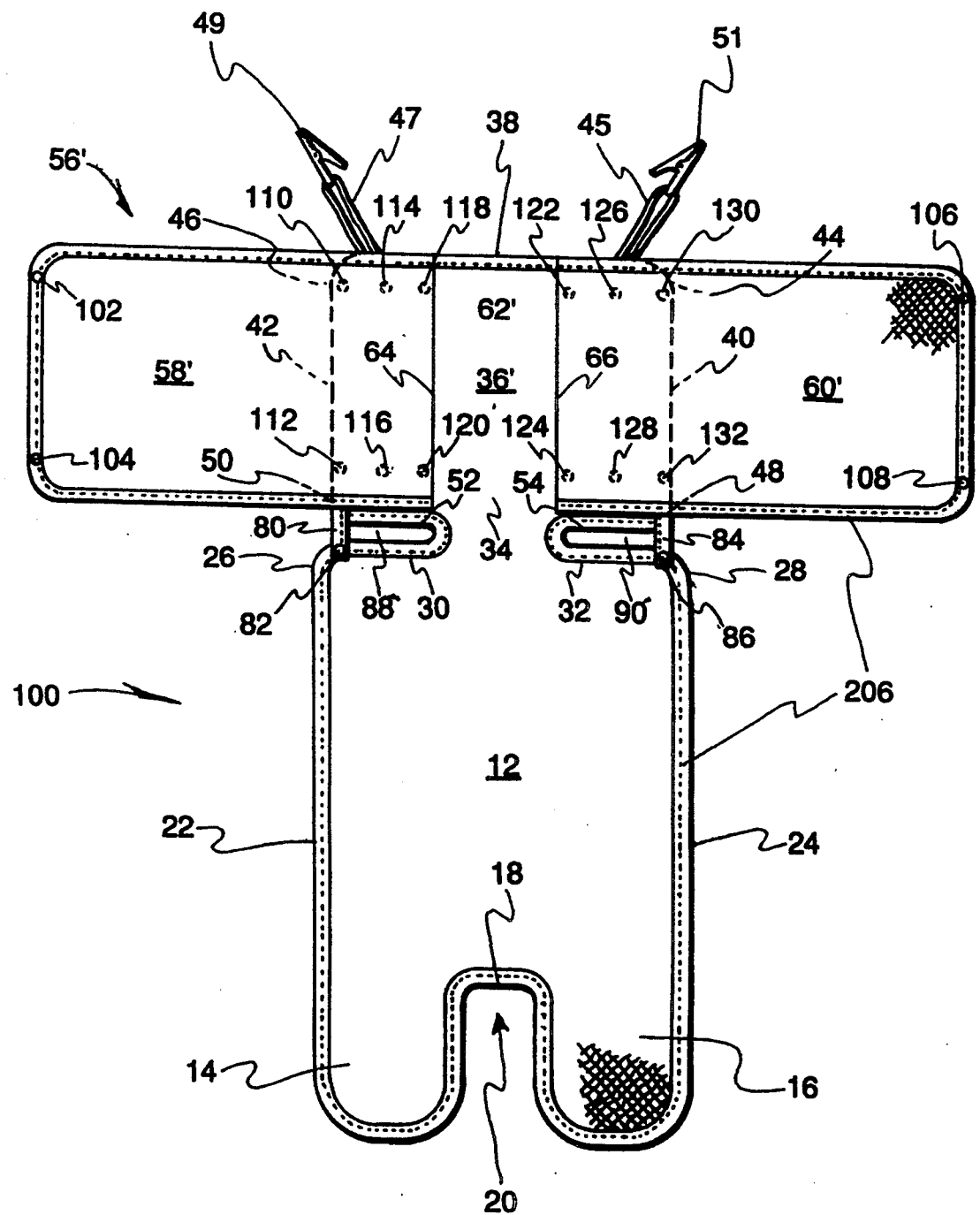
FIG. 4 is a top plan view of a head support according to a second embodiment of the present invention, in a flattened configuration.

FIG. 4 depicts a plan view of a slightly modified head support 100 according to a second embodiment of the invention. Elements and features of the second embodiment 100 substantially identical to those described in detail above with reference to the first embodiment 10 are designated by identical reference numerals. Slightly modified elements and features are designated by the previously used corresponding reference numerals with the addition of a prime symbol (').

The head support 100 differs from the head support 10 in three principal respects. First, the base member 36' comprises an integral upper portion of the liner sheet 12, with inner ends of discrete separate head support members 58' and 60' sewn thereto along seams 64 and 66. The head support members 58' and 60', as in the case of the first embodiment 10, each preferably comprise a resilient foam piece, preferably so-called dense "Egg crate" foam, disposed within a quilted fabric cover. Second, snap fasteners, instead of hook and loop pile fasteners, adjustably secure free end portions of the head support members 58' and 60' to the base member 36' in a plurality of discrete adjusted positions. In particular, snap fastener pair 102, 104 on the underside of head support member 58' releasably engage a selected one of complementary snap fastener pairs 110, 112; 114,116; and 118, 120 disposed on the upper side of base member 36'. Similarly, snap fastener pair 106, 108 on the underside of head support member 60' releasably engage a selected one of complementary snap fastener pairs 130, 132; 126, 128; and 122, 124 disposed on the upper side of base member 36'. Third, the elastic straps and clips are replaced by pairs of twill tape ties 47', 49' and 45', 51' for the purpose of securing the head support to an infant car seat, high chair, or other structure.

Figure 5:
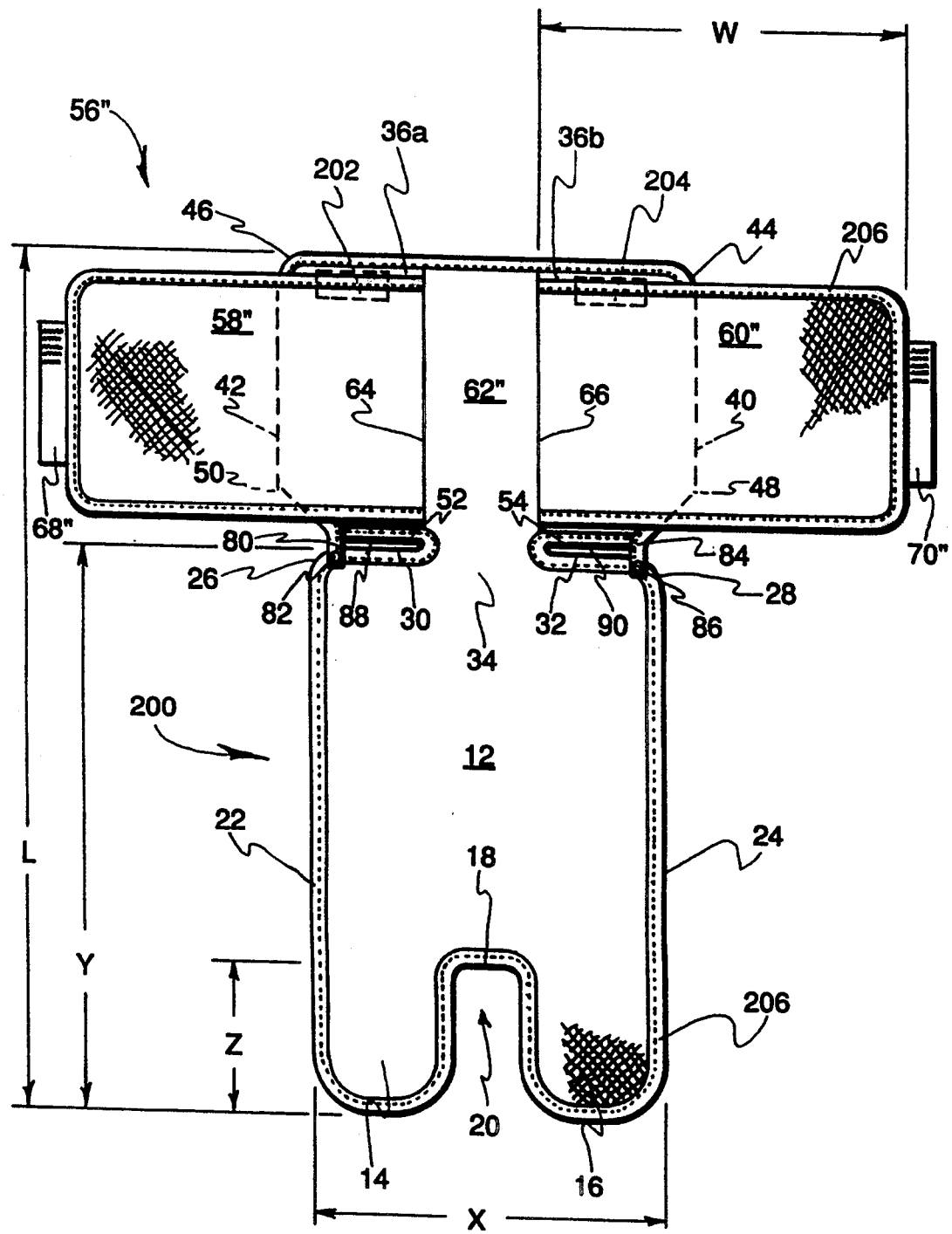
FIG. 5 is a top plan view of a head support according to a third embodiment of the present invention, in a flattened configuration.
Figure 7:
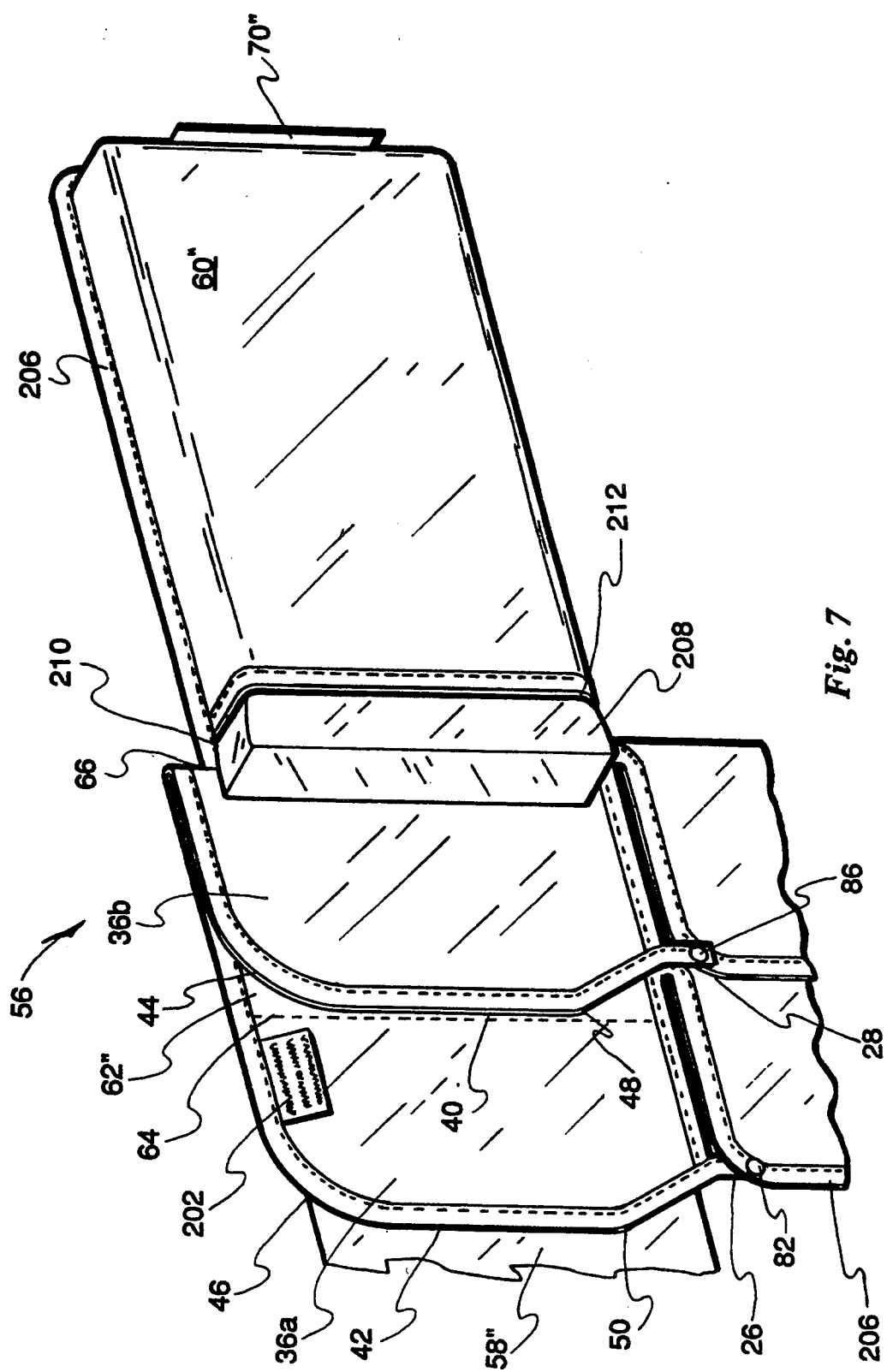
FIG. 7 is a partial rear perspective detail view of the head support of FIG. 5 in a folded condition.

FIGS. 5, 6, and 7 illustrate a third and currently most preferred embodiment (for use by infants and small children) of the invention 200, similar in most respects to the first embodiment 10 illustrated and described above. Elements and features of the third embodiment 200 substantially identical to those described in detail above with reference to the first embodiment 10 are designated by identical reference numerals. Slightly modified elements and features are designated by the previously used corresponding reference numerals with the addition of a double prime symbol (").

The head support 200 differs from the head support 10 in five principal respects. First, the base member comprises two separate fabric pieces 36a and 36b sewn to the web 62" along seams 64 and 66. Second, the medial web 62" comprises an integral portion of the liner sheet 12.

Third, hook pile fastening strips 68" and 70" comprise relatively shorter, thin strips normally extending outwardly and downwardly from outer end edge portions of the head support members 58" and 60", when disposed in the flattened configuration shown in FIG. 5. This construction differs from the first embodiment 10 illustrated in FIG. 1, in which the fastening strips 68 and 70 overlie thin edge portions of the fabric covering of head support members 58 and 60 and extend substantially entirely along the length thereof. The securement of fastening strips 68" and 70" in this manner eliminates a separate sewing operation and a separate trimming operation and also eliminates the need for a separate single needle or double needle sewing machine or a separate specialized machine for attaching a hook fastener strip, thereby saving significant labor time.

Fourth, the elastic loop straps 45, 47 and associated clips 51, 49 are replaced by hook pile fastening patches 202, 204 (e.g., VELCRO TM) intended for engagement with complementary loop pile fastening members for securing the head support 200 to a car seat or other retaining device. In a currently most preferred embodiment, pair of twill tape ties such as those illustrated at 47', 49' and 45', 51' in FIG. 4 are substituted for the patches 202, 204.

Fifth, the fabric covering encasing the foam pieces of head support members 58" and 60" each include inner open ends to allow removal of the foam pieces for cleaning purposes. Thus, the remainder of the head support 200 may be conveniently machine washed and dried after removal of the foam pieces. Specifically, each of the head support members 58" and 60" comprises two elongated substantially rectangular overlying fabric layers sewn together along the two long edges and the outer short edge to form an envelope or cover dimensioned for insertion of the foam piece 208, as shown in FIG. 7. The inner short edge 210 of only the top sheet is sewn to the web 62" along a seam (64 or 66), leaving the inner short edge 212 of the bottom sheet free, thus maintaining an opening for insertion and removal of the foam piece 208. A relatively snug fit of the cover and attendant frictional forces maintain the foam piece 208 against unintentional displacement. It should be noted that FIG. 7 is a partial rear perspective view which depicts the base member 36b folded back over the web 62" for purposes of illustrating the manner of insertion and removal of the foam piece 208 of the support 60".

Figure 8:
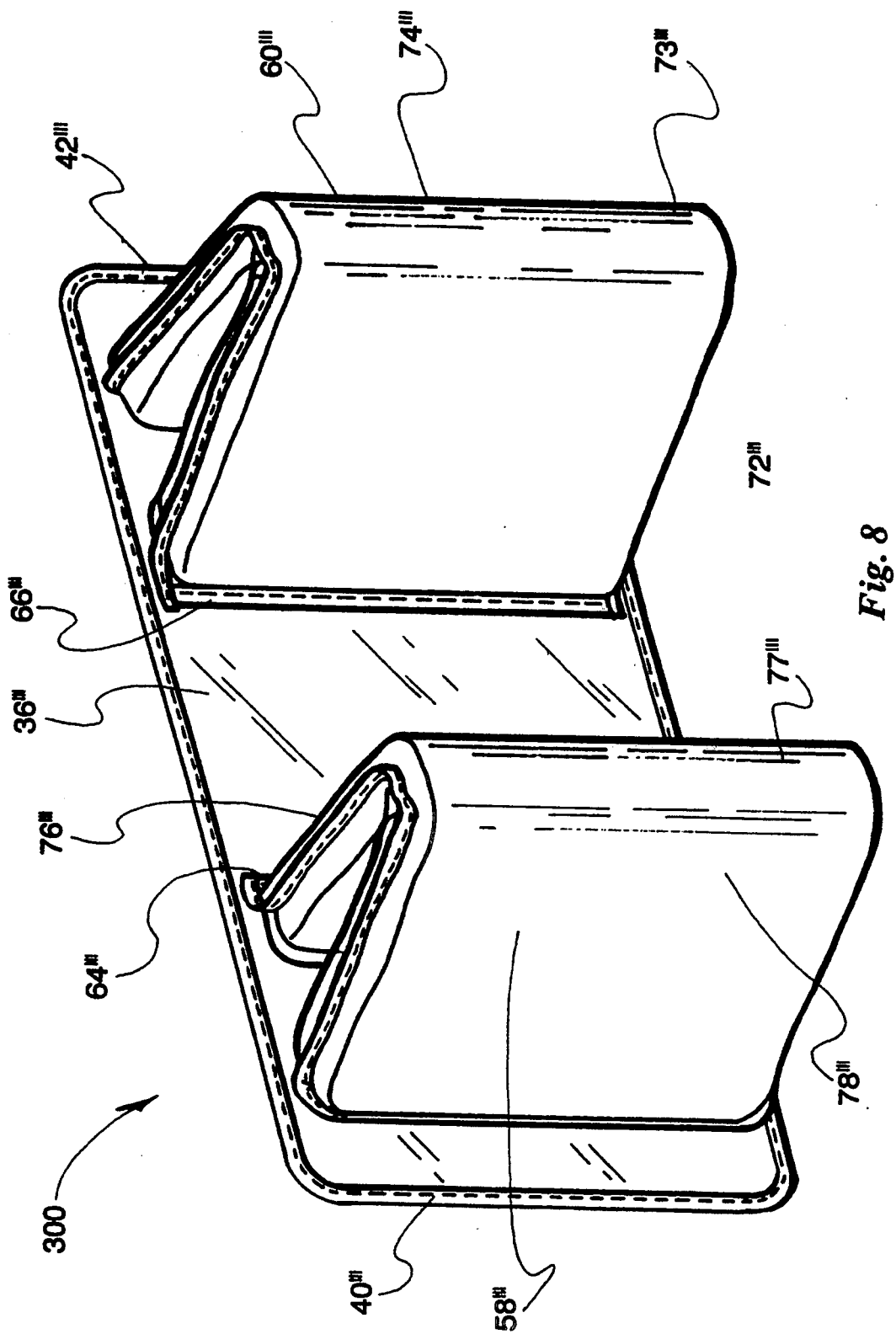
FIG. 8 is a front perspective view illustrating a head support according to a fourth embodiment of the present invention, in an erect configuration.
Figure 9:
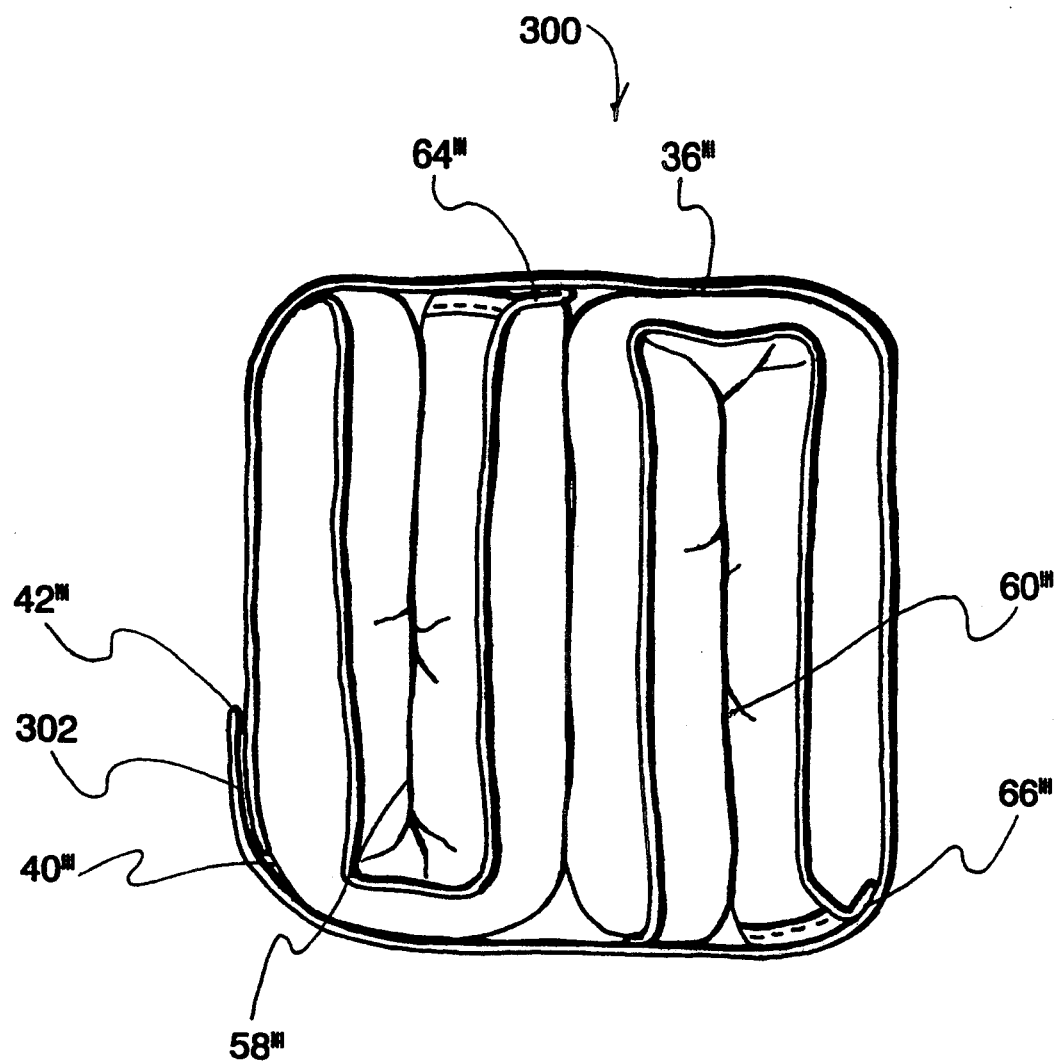
FIG. 9 is an end elevational view of the head support of FIG. 8 in a folded configuration for storage.

FIGS. 8 and 9 illustrate a head support according to a modified fourth embodiment 300 of the present invention, essentially similar to the third embodiment 200 illustrated in FIGS. 5, 6, and 7, with the exception that the liner sheet 12 has been omitted. The head support 300 is most intended and most preferred for use by adults and older children, particularly while traveling on trains, busses, cars, airplanes, etc., or while relaxing in easy chairs and recliners, in order to maintain the user's head in an upright orientation while sleeping, for example. The head support 300 includes a base member or sheet 36''' to which head support members 58''' and 60''' are permanently secured along seams 64''' and 66'''. The opposite edges of the members 58''' and 60''' are preferably adjustably securable to the base member 36''' by cooperating hook and loop pile fasteners (VELCRO) or by snap fasteners, in the manners described above. As shown in FIG. 9, the head support 300 rolls into a compact orientation for storage, with engagement of cooperating hook and loop pile fasteners 302 disposed centrally along opposite edges 40''' and 42''' serving to secure the head support in the compact rolled orientation.

FIGS. 10, 11, 12, and 13 illustrate various different alternative transverse cross-sectional shapes which may be employed in the construction of the head support members 58 and 60. For example, in FIG. 10 the head support members $58^{iv}$ and $60^{iv}$ have a rounded shape and comprise air bladders selectively inflatable through conventional fittings or nipples 400 and 402 of the type found on beach balls. In FIG. 11, head support members $58^v$ and $60^v$ have a triangular shape, and may each be formed from a solid block of foam with a suitable fabric covering. Head support members $58^{vi}$ and $60^{vi}$ shown in FIG. 12 possess a generally rectangular shape, with radiused inner longitudinal edges. Similarly, in FIG. 13, head support members $58^{vii}$ and $60^{vii}$ have a rectangular shape with radiused inner and outer longitudinal edges.

While the various components of the present invention may be formed from a wide variety of materials and with a variety of different dimensions within the intended scope of the invention, certain currently preferred parameters and materials are set forth hereinafter. The head support 200 preferably has an overall length L of about 25 inches; a liner sheet length Y of about 17 inches; a leg length Z of about 4.5 inches; a width X of about 10.25 inches; and a head support member lateral extent in a flattened condition of about 10 inches. The head support members 58, 60; 58', 60'; and 58", 60" of each of the three embodiments 10, 100, and 200 are each preferably adjustable such that the resulting apexes 77 and 73 have an upward extent in the range of 3 to 5 inches so as to afford sufficient head support without unduly obstructing the lateral vision of an infant or child.

While a variety of materials possessing the characteristics described above may be utilized, the following materials are particularly preferred in the manufacture of the head support 200: liner sheet 12 and covers for head supports 58", 60" polycotton woven fabric or terry cloth; base members 36a, 36b VELCRO TM plush fabric; foam pieces for head supports 58", 60" a dense Egg crate foam.

As illustrated throughout the drawings, conventional sewn or adhesive seam binding tape 206 is preferably employed to reinforce the various edge portions and seams as well as to provide an attractive finished appearance.

While the preferred form of the invention employs unitary single pieces of foam in each of the supports 58, 60, 58', 60', 58", 60", it is also contemplated that a plurality of foam pieces in each support may also be employed. Additionally, the support members might have shapes other than the illustrated A-frame configuration in their erected orientation. For example, the supports might have other erected configurations when viewed from the top end as in FIGS. 2 and 3 such as pointed, rounded, rectangular, circular, square, oval, etc., without departing from the scope of the invention.

Other modifications of the construction of the head support are also contemplated within the scope of the invention. For example, the head support members 58 and 60 might comprise inflatable air bladders instead of or in addition to the foam pieces. Instead of foldable foam pieces, solid blocks of foam might be employed. The head support members 58 and 60 may also be detachable secured to the base member 36, for example by snaps, hook and loop pile fasteners (VELCRO), zippers, etc. Also, the head support members 58 and 60 need not necessarily be adjustable; they might be permanently or detachable secured in a fixed predetermined orientation.

In addition to functioning to support a user's head, the head supports according to the various disclosed embodiments of the invention also serve to partially block a user's ears, thus muffling ambient sound and facilitating rest and sleep.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A head support, comprising:
   a flexible base member dimensioned to at least partially support the head of an individual;
   a pair of elongated flexible resilient support members;
   each of said head support members comprising a foam piece within a cover, said cover including elongated substantially rectangular overlying top and bottom fabric layers sewn together along two long edges and an outer short edge to form an envelope dimensioned for insertion said foam piece, an inner short edge of only said top sheet being sewn to said base member, leaving an inner short edge of said bottom sheet free, thus maintaining an opening for inserting and removal of said foam piece such that a relatively snug fit of said cover and attendant frictional forces maintain said foam piece against unintentional displacement;
   fastening means connecting an inner short edge of each of said support members to said base member;
   securing means disposed adjacent a free end portion of each of said support members for selectively adjustably securing said free end portion of each of said support members to said base member for adjusting an angle of inclination of said support member with respect to said base member for supporting the head of an individual therebetween such that each of said support members is disposed in an at least partially overfolded A-frame configuration forming inner and outer inclined surfaces connected by an apex portion; and
   each of said inner inclined surfaces of said support members dimensioned and disposed for abutment with a side portion of the head of an individual.

2. The head support of claim 1,
   wherein said securing means comprises cooperating hook and loop pile fasteners on said base member and said support members.

3. The head support of claim 1, wherein said securing means comprises cooperating snap fasteners on said base member and said support members.

4. The head support of claim 1, wherein said base member comprises fabric.

5. The head support of claim 1, further comprising means for connecting said base member to an infant retaining device.

6. The head support of claim 5, wherein said means for connecting comprises at least one tie member secured to said base member and adapted for engagement with an infant retaining device.

7. The head support of claim 1, wherein said support members each possessing a lateral extent in a flattened condition substantially greater than a lateral extent of said base member.

8. The head support of claim 1, further comprising a liner sheet connected to said base member and dimensioned for at least partially supporting a torso of an infant or child.

9. The head support of claim 8, further comprising slotted portions formed between said base member and said liner sheet for receiving retaining straps of an infant retaining device.

10. The head support of claim 1, wherein said support members comprise an inflatable bladder.

11. The head support of claim 1, further comprising means disposed along opposite edges of said base member for securing said headrest in a compact rolled orientation for transportation and storage.

12. A head support, comprising:
  a flexible fabric base member dimensioned to at least partially support the head of an individual;
  a pair of elongated flexible resilient support members, said support members each possessing a lateral extent in a flattened condition substantially greater than a lateral extent of said base member;
  each of said flexible support members including a foam piece within a cover, said cover including elongated substantially rectangular overlying top and bottom fabric layers sewn together along two long edges and an outer short edge to form an envelope dimensioned for insertion of said foam piece, an inner short edge of only said top sheet being sewn to said base member, leaving an inner short edge of said bottom sheet free, thus maintaining an opening for insertion and removal of said foam piece such that a relatively snug fit of said cover and attendant frictional forces maintain said foam piece against unintentional displacement;
  securing means disposed adjacent a free end portion of each of said support members for selectively adjustably securing said free end portion of each of said support members to said base member for adjusting an angle of inclination of said support member with respect to said base member for supporting the head of an individual therebetween such that each of said support members disposed in an at least partially overfolded A-frame configuration forming inner and outer inclined surfaces connected by an apex portion;
  each of said inner inclined surface of said support members dimensioned and disposed for abutment with a side portion of the head of an individual; and
  means disposed along opposite edges of said base member for securing said headrest in a compact rolled orientation for transportation and storage.

13. The head support of claim 12,
  wherein said securing means comprises cooperating hook and loop pile fasteners on said base member and said support members.

14. The head support of claim 12, wherein said securing means comprises cooperating snap fasteners on said base member and said support members.

15. A head support, comprising:
  a flexible fabric base member dimensioned to at least partially support the head of an individual;
  a pair of elongated flexible resilient support members, said support members each possessing a lateral extent in a flattened condition substantially greater than a lateral extent of said base member;
  each of said flexible support members including a foam piece within a cover, said cover including elongated substantially rectangular overlying top and bottom fabric layers sewn together along two long edges and an outer short edge to form an envelope dimensioned for insertion of said foam piece, an inner short edge of only said top sheet being sewn to said base member, leaving an inner short edge of said bottom sheet free, thus maintaining an opening for insertion and removal of said foam piece such that a relatively snug fit of said cover and attendant frictional forces maintain said foam piece against unintentional displacement;
  securing means disposed adjacent a free end portion of each of said support members for selectively adjustably securing said free end portion of each of said support members to said base member for adjusting an angle of inclination of said support member with respect to said base member for supporting the head of an individual therebetween such that each of said support members is disposed in an at least partially overfolded A-frame configuration forming inner and outer inclined surfaces connected by an apex portion; and
  each of said inner inclined surfaces of said support members dimensioned and disposed for abutment with a side portion of the head of an individual.

16. The head support of claim 15, wherein said securing means comprises cooperating hook and loop pile fasteners on said base member and said support members.

* * * * *